United States Patent
Ratinaud et al.

(10) Patent No.: US 10,989,127 B2
(45) Date of Patent: Apr. 27, 2021

(54) CONTROL METHOD FOR THE OPTIMISATION OF THE MANAGEMENT OF INJECTION MEANS OF AN INTERNAL COMBUSTION ENGINE

(71) Applicants: Continental Automotive France, Toulouse (FR); Continental Automotive GmbH, Hannover (DE)

(72) Inventors: Johann Ratinaud, Toulouse (FR); Valériane Steiner, Toulouse (FR); Edouard Gambier, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 0 days.

(21) Appl. No.: 16/490,965

(22) PCT Filed: May 17, 2018

(86) PCT No.: PCT/FR2018/051186
§ 371 (c)(1),
(2) Date: Sep. 4, 2019

(87) PCT Pub. No.: WO2018/211221
PCT Pub. Date: Nov. 22, 2018

(65) Prior Publication Data
US 2020/0025120 A1    Jan. 23, 2020

(30) Foreign Application Priority Data

May 18, 2017    (FR) ........................................ 1754411

(51) Int. Cl.
*F02D 41/02*    (2006.01)
*F02D 41/04*    (2006.01)
(Continued)

(52) U.S. Cl.
CPC ....... *F02D 41/0275* (2013.01); *F02D 41/029* (2013.01); *F02D 41/045* (2013.01);
(Continued)

(58) Field of Classification Search
CPC .. F02D 41/0275; F02D 41/029; F02D 41/045; F02D 41/2467; F02D 41/405; F02D 2200/0802; F02M 65/001
See application file for complete search history.

(56) References Cited

U.S. PATENT DOCUMENTS

2016/0177793 A1* 6/2016 Keppy ................ F02D 41/0275
                                                             60/274

FOREIGN PATENT DOCUMENTS

DE    102009058339 A1    6/2011
DE    202014009562 U1    3/2016
(Continued)

OTHER PUBLICATIONS

International Search Report and Written Opinion for International Application No. PCT/FR2018/051186, dated Sep. 17, 2018—9 pages.
(Continued)

*Primary Examiner* — Brandon D Lee
(74) *Attorney, Agent, or Firm* — RatnerPrestia

(57) ABSTRACT

A control method dedicated to the management of an injector of an internal combustion engine, the internal combustion engine being coupled to a device for the post-treatment of the exhaust gases, when an additional injection for treating the gases or an additional injection for calibrating the injection is demanded by the controller, the method including a step of combining the gas-treatment additional injection and the additional injection for calibrating the injection into one, the combining-into-one being performed when additional-injection parameters are compatible.

9 Claims, 1 Drawing Sheet

(51) Int. Cl.
*F02D 41/24* (2006.01)
*F02D 41/40* (2006.01)
*F02M 65/00* (2006.01)

(52) U.S. Cl.
CPC ........ *F02D 41/2467* (2013.01); *F02D 41/405* (2013.01); *F02D 2200/0802* (2013.01); *F02M 65/001* (2013.01)

(56) References Cited

FOREIGN PATENT DOCUMENTS

| EP | 2550447 A1 | 1/2013 |
|----|------------|--------|
| WO | 2011119089 A1 | 9/2011 |
| WO | 2013081529 A1 | 6/2013 |

OTHER PUBLICATIONS

Mercedes Benz Service: "CDI Diesel Direct Injection for OM 651", System Description, Sep. 1, 2008, retrieved from the internet: http://www.autocats.ws/manuals/sdmedia/mediadb/mb_Acrobat/motor/dieselmotor/sb_cdi_om651_br204_de.pdf—68 pages.

* cited by examiner

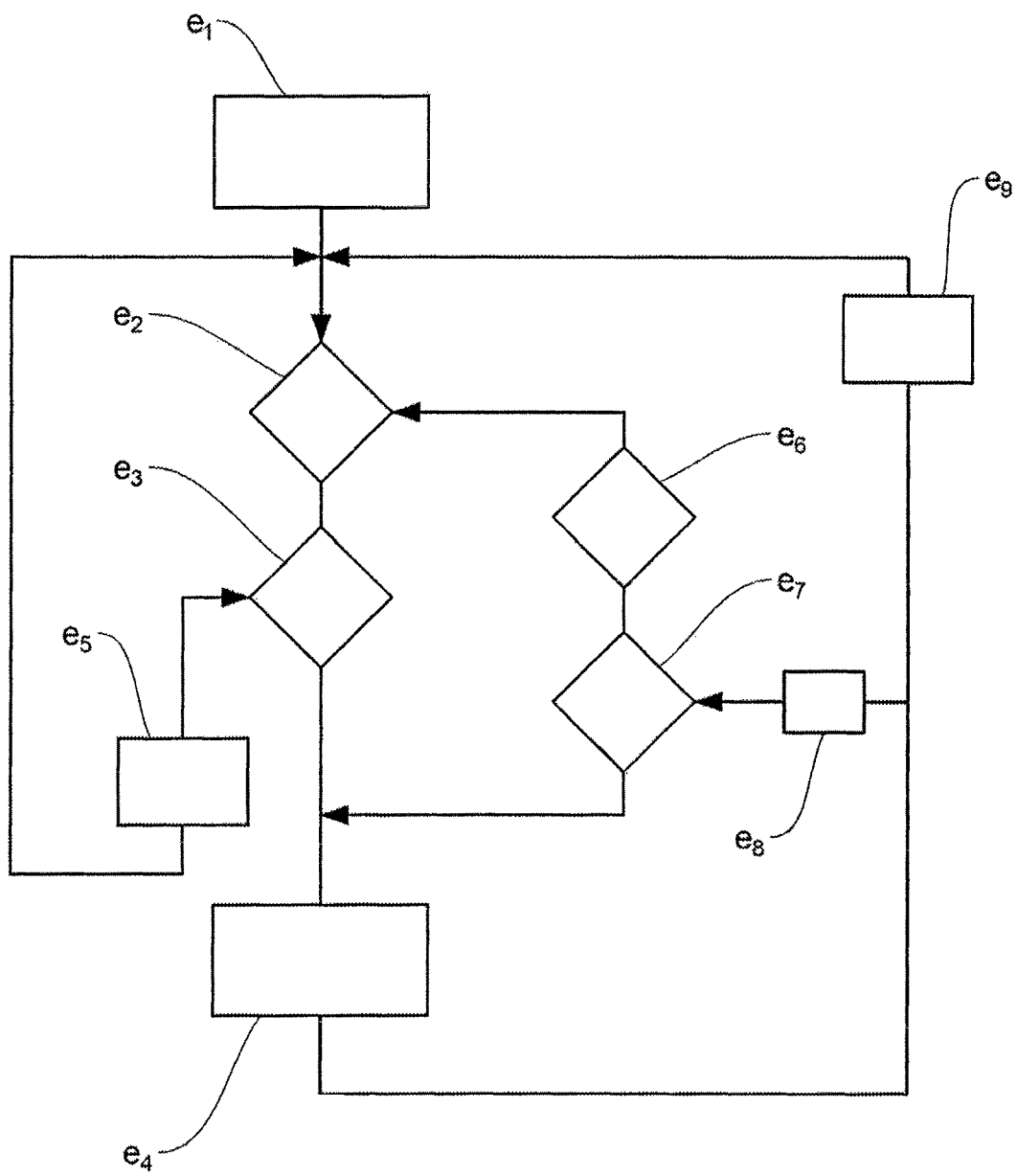

CONTROL METHOD FOR THE OPTIMISATION OF THE MANAGEMENT OF INJECTION MEANS OF AN INTERNAL COMBUSTION ENGINE

CROSS REFERENCE TO RELATED APPLICATIONS

This application is the U.S. National Phase Application of PCT International Application No. PCT/FR2018/051186, filed May 17, 2018, which claims priority to French Patent Application No. 1754411, filed May 18, 2017, the contents of such applications being incorporated by reference herein.

FIELD OF THE INVENTION

The present invention relates in general to the management of an internal combustion engine.

It relates more particularly to a method for managing the injection means of the internal combustion engine.

The method of the present invention can be implemented, for example, in an engine control computer.

BACKGROUND OF THE INVENTION

With increasingly stricter pollution control standards, controlling and treating the pollutants in the exhaust gases emitted by motor vehicles into the atmosphere is of great importance. However, the treating of these pollutants must neither impact the performance of the motor vehicle nor make the driving experience unpleasant for the driver. In order to comply with these standards and limit the emission of pollutants, industry has been developing various technological solutions.

A first technological solution well known to those skilled in the art relies on the principle of treating the exhaust gases emitted by the internal combustion engine. Means for the post-treatment of the exhaust gases comprising, for example, a catalytic converter, are used and in this case allow the pollutants present in the exhaust gases to be treated by catalytic conversion. The catalytic converter oxidizes the unburned hydrocarbons, carbon monoxide, and even oxides of nitrogen. In order to perform this catalytic conversion, the catalytic converter contains a catalyst which generally adopts a "honeycomb" structure. The catalyst may be made up of a ceramic monolith with precious metals.

In order to activate a catalytic reaction, the catalyst needs to be brought up to a threshold operating temperature of the order of 300° C. Once this threshold light-off operating temperature is reached, the catalytic converter is considered to be effective at treating the pollutants, which means to say that the catalytic reaction is optimal. However, in order to treat said pollutants effectively, the catalytic converter needs to be at this threshold operating temperature (or even above it) throughout the duration of operation of the internal combustion engine, otherwise the catalytic reaction is not very active, if active at all, and the pollutants present in the exhaust gases are not correctly treated.

In the case of city use of the motor vehicle, it is difficult to reach this threshold operating temperature, and especially to maintain it, because of the low engine speed.

In order to activate the catalytic reaction optimally, industry has developed a strategy for controlling the internal combustion engine in such a way as to achieve an increase in temperature and maintain this threshold operating temperature of the catalytic converter by directly influencing the control of the injections of the internal combustion engine.

Thus, for example, one solution known to those skilled in the art involves commanding late injections so as to create a combustion just before an exhaust phase, this contributing to greatly increasing the temperature of the exhaust gases leaving the internal combustion engine and therefore to increasing the temperature of the catalytic converter.

This technological solution thus makes it possible to improve the treatment of the exhaust gases emitted by the internal combustion engine. However, it has the chief disadvantage of substantially degrading the operating conditions of the internal combustion engine and notably of increasing its fuel consumption. Specifically, these late injections are used only to increase and maintain the temperature of the catalytic converter, and play no part in creating engine torque.

A second solution developed by industry for controlling the pollution emitted by the motor vehicle relies on monitoring, and making allowances for, potential drift in the injectors of the internal combustion engine. Specifically, during the life of an injector the latter may, for various reasons, drift and therefore inject a greater or lesser amount of fuel for the same setpoint signal.

There are a number of solutions in existence for controlling this drift. Thus, for example, one solution is to perform an injection referred to as a test injection, which is not designed to create engine torque. This test injection is performed under very precise conditions and makes it possible, through various means, to measure the discrepancy between the nominal response and the actual response of the injector.

Thus, for example, the deviation in the hydraulic closure of the injector can be tested by reading off the voltage at the terminals of this injector. In the case of the use of an injector with "servo" control and piezoelectric actuator, the piezoelectric element may be used as a sensor to determine the instant of injector closure. A test injection is performed at the end of an engine cycle (and therefore does not produce engine torque) because determining the instant of closure requires a certain amount of measurement time that is incompatible with the separations between injections which are demanded by the conventional injection pattern.

Another solution is to measure the discrepancy in injected quantity by measuring the drop in pressure in the rail. In order to do this, a test injection is performed using a given quantity and with sufficient time before and after this test injection to take a pressure measurement before and after this injection. In addition, this test injection is performed outside of the delivery phase of the high-pressure pump so that the pressure-drop measurement is associated only with the performance of the injection and not influenced by the delivery of the pump. In this way, the quantity actually injected is correlated with the measured drop in pressure.

The discrepancy in the quantity injected can also be measured by measuring a richness in the exhaust. In order to do this, a test injection is performed and a richness measurement is carried out using a lambda probe arranged in the exhaust. The measured richness value is then correlated with the quantity injected.

The combustions needed for the post-treatment of the pollutants and the combustions needed for calibrating the injectors are managed independently. Thus, an internal combustion engine which uses the above technological solutions may exhibit an overconsumption of fuel that may range as high as 10%.

SUMMARY OF THE INVENTION

An aspect of the invention proposes a method intended for controlling and optimizing the management of the injection means of an internal combustion engine of a motor vehicle that makes it possible partially or fully to overcome the technical shortcomings of the cited prior art.

To this end, a first aspect of the invention proposes a control method dedicated to the management of injection means of an internal combustion engine, the internal combustion engine being coupled to means for the post-treatment of the exhaust gases, when a command to inject fuel for the treatment of the exhaust gases or a command to inject fuel for calibrating the injection means is demanded by the control means, the method comprises a step of combining into one the command to inject fuel for the treatment of the exhaust gases with that dedicated to the calibration of the injection means, the combining-into-one being performed when the injection commands are compatible.

Thus it is possible, by combining injections that do not generate torque, to control the fuel consumption of the motor vehicle.

In one exemplary embodiment, it is proposed that the command to inject fuel for treatment of the means for the post-treatment of the exhaust gases have first injection parameters.

As an alternative, it is also proposed that the command to inject fuel for the calibration of the injection means have second injection parameters.

Advantageously, the method of an aspect of the invention proposes that when a command to inject fuel for treatment of the means for the post-treatment of the exhaust gases is demanded, the method comprise a step of comparing the first injection parameters and the second injection parameters of a potential command to inject fuel for the calibration of the injection means.

It is for example proposed that, when the second injection parameters are compatible with the first injection parameters, then the command to inject fuel for treatment of the means for the post-treatment of the exhaust gases be common, and be used for the calibration of the injection means.

In order to improve the combining-into-one of the injections that do not generate engine torque, the method comprises for example a step in which, when a command to inject fuel for the calibration of the injection means is demanded, the method comprises a step of comparing the second injection parameters and the first injection parameters of a potential command to inject fuel for treatment of the means for the post-treatment of the exhaust gases.

Advantageously, it is for example proposed that the second injection parameters used for the calibration of the injection means be replaced by the first injection parameters.

For example, the command to inject for treatment of the means for the post-treatment of the exhaust gases and the command to inject fuel for the calibration of the injection means are post-injections.

In order to simplify its implementation, it is proposed for example that the control means be an engine control computer.

BRIEF DESCRIPTION OF THE DRAWINGS

Other features and advantages of aspects of the invention will become more apparent upon reading the description that will follow. This description is purely illustrative and should be read with reference to the appended drawings, in which:

The FIGURE is a flow diagram of the method of an aspect of the invention.

DETAILED DESCRIPTION OF THE PREFERRED EMBODIMENTS

The remainder of the description will set out a control method dedicated to the management of the injection means of an internal combustion engine of a motor vehicle. The injection means are, for example, injectors allowing the injection of fuel into a common rail of the internal combustion engine. As an alternative, the injectors may be coupled directly to the respective cylinders.

The injection means are controlled by at least one electronic computer, such as an engine control computer for example. The electronic computer is designed to, amongst other things, on the basis of a determined strategy, control the amount of fuel injected by the injection means by modifying, for example, the length of time for which an injector remains open. Of course, other parameters of the injection means may be modified in order to control the quantity of fuel injected.

As is known by those skilled in the art, an internal combustion engine operates on a determined engine cycle. The engine cycle for a four-stroke engine for example, is made up of four engine phases: an admission stroke, a compression stroke, a combustion stroke and finally an exhaust stroke.

Depending on the engine stroke, the electronic computer commands amongst other things the injection means to perform injections of fuel in order to create engine torque needed to propel the motor vehicle. In general, the strokes of the engine are synchronized with respect to a position of the crankshaft. There are numerous strategies in existence for synchronizing the injections with respect to the position of the crankshaft, and these are well known to those skilled in the art.

As mentioned earlier in the text of the description, in addition to the injections that generate engine torque, additional injections may also be managed by the electronic computer. These additional injections are used to monitor, for example, potential drift of the injection means. Specifically, during the life of the motor vehicle, the injection means age and may drift. What is understood here by drift is that, in response to the one same setpoint signal, an injector may inject a greater or lesser amount of fuel.

In order to monitor and determine the drift of the injection means, additional injections that supplement the injections that generate engine torque are performed and monitored by the electronic computer. These additional injections may be positioned before or after the torque-generating injections. Of course, a person skilled in the art knows that the quantity of fuel injected is infinitesimal in comparison with the torque-generating injections, and said additional injections are intended to monitor the drift of the injection means. The strategy for controlling these injections will not be discussed further here.

As mentioned above, in instances in which the motor vehicle is equipped with means for the post-treatment of the exhaust gases, other additional injections of fuel are also used to keep the exhaust gas post-treatment means effective. In general, these additional injections, in order to be effective, need to be positioned at different crank angles in an engine cycle from the other additional injections dedicated to calibrating the injection means. Furthermore, the quantity of fuel injected in the additional injections dedicated to calibrating the injection means is different from the quantity of fuel injected in the additional injections dedicated to the exhaust gas post-treatment means.

Thus, during an engine cycle, a number of injections of fuel may be performed in addition to the torque-generating injection of fuel. Furthermore, in the case of the additional injections, the frequency and also the quantity of fuel injected are often different, giving rise to an increase in the fuel consumption of the motor vehicle.

The method of an aspect of the invention cleverly proposes to combine into one some of the additional injections according to a determined strategy so as to reduce the number of these and thus appreciably reduce the fuel consumption of the motor vehicle and therefore reduce the impact it has on the environment.

In order to make an aspect of the invention easier to understand, the choice has been made not to set out in detail the characteristics of the fuel injections. Thus, the fuel injections will not be set out according to engine stroke or according to precise positions in terms of crank angle. Those skilled in the art are perfectly aware that, depending on the control strategy and on the type of internal combustion engine, these injections may occupy positional ranges that may be slightly offset from a determined crankshaft position.

In the remainder of the description, an injection is characterized by a first angular-timing point (with respect to the angular position of the crankshaft during the engine cycle) that corresponds to the start of the injection of fuel, a second angular-timing point that corresponds to the end of the injection of fuel, a delivery of fuel delivered by the injection means and a fuel pressure. Furthermore, a mean engine speed during the fuel injection may also be taken into consideration.

The FIGURE is a flow diagram of the method of an aspect of the invention. The method of the invention begins, and is active, for example right from the time the internal combustion engine is started and remains in operation until said internal combustion engine has completely stopped.

The method of an aspect of the invention has a first step e1: activation. During this activation first step e1 at least a first monitoring parameter PS_1 is activated. For example, the first monitoring parameter PS_1 is a distance meter and increments according to the distance covered.

As an alternative, the first monitoring parameter PS_1 may also be a time meter measuring the duration of operation of the internal combustion engine.

In another alternative form, the first monitoring parameter PS_1 may comprise several monitoring parameters.

According to the method of an aspect of the invention, the first monitoring parameter PS_1 is dedicated to the calibration of the injection means. Thus, according to the strategy of the method of an aspect of the invention, when the first monitoring parameter PS_1 is above a first reference value PS_1_ref, then a calibration of the injection means is needed. This calibration step will be set out later on in the description.

The method of an aspect of the invention next comprises a second step e2 which consists in monitoring at least a second monitoring parameter SP_2. According to the method of an aspect of the invention, the second monitoring parameter SP_2 is used to determine whether or not there is a need to activate the exhaust gas post-treatment means. What is meant here by activating the exhaust gas post-treatment means is increasing to and/or maintaining at a determined temperature. Thus, in instances in which it is necessary to activate the exhaust gas post-treatment means, the method of an aspect of the invention plans to pass on to a third step e3, and in instances where there is no need to activate the exhaust gas post-treatment means, the method plans to pass on to a sixth step e6.

For example, in instances in which the exhaust gas post-treatment means comprise a catalyst and the latter needs, as is known to those skilled in the art, to be at a determined operating temperature in order for the catalysis phenomenon to occur, then the second monitoring parameter SP_2 corresponds to the temperature of the catalyst. In instances in which the value of the second monitoring parameter SP_2 is below a second reference value SP_2_ref, then according to the method of an aspect of the invention, an additional injection for the treatment of the gases is needed in order to raise and/or maintain the temperature of the catalyst. The temperature of the catalyst is measured for example by suitable temperature measurement means. The temperature measurement means may be a temperature sensor.

A gas-treatment additional injection IC_TG_1 is characterized by a first gas-treatment additional-injection angular-timing point P1_IC_TG_1, a second gas-treatment additional-injection angular-timing point P2_IC_TG_1, and a gas-treatment additional-injection fuel delivery D_IC_TG_1. The gas-treatment additional injection IC_TG_1 is further characterized here also by the engine speed RPM_IC_TG_1. The engine speed here corresponds to the engine speed at the start of the second step e2.

As mentioned above, the gas-treatment additional injection IC_TG_1 is independent of the injection that generates engine torque.

As an alternative, the gas-treatment additional injection IC_TG_1 may be broken down into several gas-treatment additional injections during the same engine cycle.

In another exemplary embodiment, still during the second step e2, in instances in which the exhaust-gas post-treatment means comprise a particulate filter, then the second monitoring parameter SP_2 may be a pressure value. Thus, for example, the pressure upstream and downstream of the particulate filter may be measured to make it possible to calculate a differential pressure corresponding to the difference between the pressure at the outlet and at the inlet of the particulate filter. This differential-pressure value therefore corresponds to the second monitoring parameter SP_2.

Thus, according to the method of an aspect of the invention, when the value of the second monitoring parameter SP_2 is above a threshold pressure value SP_2_ref, that means that a procedure for regenerating the particulate filter is needed. Regenerating the particulate filter involves increasing the temperature thereof using at least one gas-treatment additional injection IC_TG_2.

The gas-treatment additional injection IC_TG_2 is characterized by a first gas-treatment additional-injection angular-timing point P1_IC_TG_2, a second gas-treatment additional-injection angular-timing point P2_IC_TG_2, and a gas-treatment additional-injection fuel delivery D_IC_TG_2. The gas-treatment additional injection IC_TG_2 is further characterized here by the engine speed RPM_IC_TG_2. The engine speed RPM_IC_TG_2 here corresponds to the engine speed at the start of the second step e2.

In instances in which, for example, the exhaust-gas post-treatment means comprise a NOx trap, then the second monitoring parameter SP_2 may correspond to the amount of NOx deduced by a sensor or by a model implemented in the electronic computer. Thus, for example, according to the method of an aspect of the invention, it is considered that if the value of the second monitoring parameter SP_2 is above a threshold pressure value SP_2_ref, that means that a regeneration of the NOx trap is needed. Regenerating the NOx trap involves increasing the temperature thereof using at least one gas-treatment additional injection IC_TG_3.

The gas-treatment additional injection IC_TG_3 is characterized by a first gas-treatment additional-injection angular-timing point P1_IC_TG_3, a second gas-treatment additional-injection angular-timing point P2_IC_TG_3, and a gas-treatment additional-injection fuel delivery D_IC_TG_3. The gas-treatment additional injection IC_TG_3 is further characterized here by the engine speed RPM_IC_TG_3. The engine speed here corresponds to the engine speed at the start of the second step e2.

As an alternative, the method of an aspect of the invention may manage all the gas-treatment additional injections of the various elements cited above.

The method of an aspect of the invention proposes to carry out a third step e3 when it is necessary to perform at least one gas-treatment additional injection. The method according to an aspect of the invention cleverly, during this third step e3, using a determined strategy determines whether the gas-treatment additional injection IC_TG_X can be combined with an additional injection IC_CI_X for the calibration of the injection means.

A calibration additional injection IC_CI_1 is characterized by a first calibration additional-injection angular-timing point P1_IC_CI_1, a second calibration additional-injection angular-timing point P2_IC_CI_1, and a calibration additional-injection fuel delivery D_IC_CI_1. The calibration additional injection IC_CI_1 is further characterized here by the engine speed RPM_IC_CI_1. The engine speed here corresponds to the engine speed at the start of the third step e3. As an alternative, the engine speed may be a given optimum speed, for example 3000 rpm.

Thus, for example, in instances in which the exhaust-gas post-treatment means comprise the catalyst, then the method of an aspect of the invention compares the gas-treatment additional-injection parameters IC_TG_1 with the calibration additional-injection parameters IC_CI_1. In instances in which most of the additional-injections parameters are compatible, then the method of an aspect of the invention combines the two injections into one making it possible, with one single injection, to maintain catalyst temperature while at the same time calibrating the injection means.

For example, during the third step e3 when the exhaust-gas post-treatment means comprise the catalyst and a gas-treatment additional injection is demanded, the method of an aspect of the invention then, during the third step e3, performs a comparison between the gas-treatment additional-injection parameters and the parameters of an additional injection for calibrating the injection means. In order to do this, the following for example are compared:
the fuel deliveries,
the angular timings with respect to crank angle,
a fuel pressure,
an engine speed.

In instances in which the parameters are compatible, then the two additional injections are combined into one and the method of an aspect of the invention moves on to a fourth step e4. For example, the parameters of the combined additional injection are those of the gas-treatment additional injection. Once the combined additional injection has been performed, the method passes on to a ninth step e9.

The ninth step e9 consists in resetting the first monitoring parameter PS_1 to zero. Once the first monitoring parameter PS_1 has been reset to zero, the method plans to move on to the second step e2.

Of course, the comparing of the additional-injection parameters uses the same strategy if the gas post-treatment means comprise a particulate filter and/or a NOx trap. As an alternative, a combined injection for all of the devices of the exhaust-gas post-treatment means is performed.

In instances in which the parameters of the additional injections are not compatible, then the method of an aspect of the invention proposes passing on to a fifth step e5.

During this fifth step e5 only the gas-treatment additional injection is performed. Of course, the parameters of the gas-treatment additional injection will take the components of the exhaust-gas post-treatment means into consideration.

Once the gas-treatment additional injection has been performed, the method of an aspect of the invention passes on to the first step e1.

The method also plans, when the first monitoring parameter PS_1 is above the reference value PS_1_ref, namely, in other words, when it is necessary to calibrate the injection means because the distance covered is greater than a threshold distance such as 500 km for example, to investigate whether the calibration additional injection can also be used for regenerating the exhaust-gas post-treatment means.

In order to do this, the method of an aspect of the invention proposes, during this fifth step e5, on the one hand, comparing the parameters of the calibration additional injection with the parameters of the gas post-treatment additional injection and, on the other hand, determining whether the exhaust-gas post-treatment means are suitably disposed to accept the additional injection. Specifically, for example, in instances in which the exhaust-gas post-treatment means comprise only the catalyst and the latter is already at an optimum temperature for the catalytic reaction, then there is no need to perform an additional injection capable of raising the catalyst temperature still further. On the other hand, if the catalyst is in a situation favorable to allowing it to accept this additional injection, then the method plans to combine the two additional injections into one.

During the sixth step e6, the method of an aspect of the invention plans to investigate the need for an additional injection for calibrating the injection means. If such an injection is not needed then the method passes on to the second step e2. If such an injection is needed then the method passes on to a seventh step e7.

The seventh step e7 consists in investigating whether the two additional injections can be combined into one. In instances in which they can be combined into one then the method passes on the fourth step e4. In instances in which they cannot be combined into one then the method passes on to an eighth step e8.

During the eighth step e8, a post-injection is carried out with only the parameters for the calibration of the injection means, and the method then passes on to the ninth step e9.

Regarding the strategy for the calibration of the injection means, this can be performed by measuring for example a hydraulic injection duration or by measuring a drop in pressure in the common rail which drop is brought about by the additional injection, or else by measuring the richness of the fuel/air mixture.

In the case of the hydraulic duration of the calibration additional injection, this can be measured by measuring an electric voltage at the terminals of an injector, making it possible to determine the drift in injected quantity.

The pressure drop may, for its part, be measured using a dedicated pressure sensor positioned in the common rail, making it possible to determine the associated drift in injected quantity.

Finally, the richness can be measured for example using a richness sensor positioned in the exhaust line and making it possible thereafter, using a dedicated computer program, to determine the associated drift in injected quantity.

An aspect of the invention is described above by way of example. It is understood that those skilled in the art are able to produce various variants of the invention without thereby departing from the scope of the patent.

The invention claimed is:

1. A control method dedicated to the management of an injector of an internal combustion engine, the internal combustion engine being coupled to means for a post-treatment of the exhaust gases, the method comprising:
   combining additional injection for gas-treatment and an additional injection for calibrating the injector into a combined additional injection, the combining being performed when the additional injection for gas-treatment or the additional injection for calibrating the injector is demanded by a controller and parameters of the additional injection for gas-treatment and parameters of the additional injection for calibrating the injector are compatible; and
   performing the combined additional injection in order to perform the gas-treatment and calibrate the injector.

2. The control method dedicated to the management of the injector of the internal combustion engine as claimed in claim 1, further comprising monitoring a second monitoring parameter $SP\_2$, wherein the additional injection for gas-treatment is activated when a value of the second monitoring parameter $SP\_2$ is below a second threshold value $SP\_2\_ref$.

3. The control method dedicated to the management of the injector of the internal combustion engine as claimed in claim 2, wherein, when the additional injection for gas-treatment is demanded, comparing the parameters of the additional injection for gas-treatment and the parameters of the additional injection for calibrating the injector is performed.

4. The control method dedicated to the management of the injector of the internal combustion engine as claimed in claim 3, wherein, when the parameters of the additional injection for gas-treatment and the parameters of the additional injection for calibrating the injector are compatible, the combined additional injection, with the parameters of the additional injection for gas-treatment, is performed.

5. The control method dedicated to the management of the injector of the internal combustion engine as claimed in claim 4, wherein, when the combined additional injection is performed, resetting a first monitoring parameter $PS\_1$ is performed.

6. The control method dedicated to the management of the injector of the internal combustion engine as claimed in claim 1, wherein, when the additional injection for calibrating the injector is demanded, testing the condition of the exhaust-gas post-treatment means is performed.

7. The control method dedicated to the management of the injector of the internal combustion engine as claimed in claim 6, wherein when the exhaust-gas post-treatment means are favorable to the additional injection for gas-treatment, the combined additional injection is performed.

8. The control method dedicated to the management of the injector of the internal combustion engine as claimed in claim 7, wherein parameters of the combined additional injection are those of the additional injection for gas-treatment.

9. The control method dedicated to the management of the injector of the internal combustion engine as claimed in claim 1, wherein the controller is an engine control computer.

* * * * *